United States Patent
Zhang et al.

(10) Patent No.: US 12,408,175 B2
(45) Date of Patent: Sep. 2, 2025

(54) MULTIPLE ACCESS TRANSMISSION CONFIGURATIONS

(71) Applicant: ZTE Corporation, Guangdong (CN)

(72) Inventors: Nan Zhang, Guangdong (CN); Li Tian, Guangdong (CN); Zhifeng Yuan, Guangdong (CN); Wei Cao, Guangdong (CN)

(73) Assignee: ZTE Corporation, Guangdong (CN)

( * ) Notice: Subject to any disclaimer, the term of this patent is extended or adjusted under 35 U.S.C. 154(b) by 659 days.

(21) Appl. No.: 17/169,121

(22) Filed: Feb. 5, 2021

(65) Prior Publication Data
US 2021/0168850 A1    Jun. 3, 2021

Related U.S. Application Data

(63) Continuation of application No. PCT/CN2018/099953, filed on Aug. 10, 2018.

(51) Int. Cl.
*H04W 72/23* (2023.01)
*H04W 72/121* (2023.01)

(52) U.S. Cl.
CPC ......... *H04W 72/23* (2023.01); *H04W 72/121* (2013.01)

(58) Field of Classification Search
CPC ............................ H04W 72/14; H04W 72/121; H04W 72/1289
See application file for complete search history.

(56) References Cited

U.S. PATENT DOCUMENTS

| | | | |
|---|---|---|---|
| 9,768,839 B2 * | 9/2017 | Vilaipornsawai ... | H04W 52/244 |
| 10,833,796 B2 * | 11/2020 | Lee ........................ | H04L 1/0004 |
| 10,932,198 B2 * | 2/2021 | Seo ........................ | H04W 52/14 |
| 11,425,756 B2 * | 8/2022 | Li ........................... | H04W 72/044 |

(Continued)

FOREIGN PATENT DOCUMENTS

| | | | | |
|---|---|---|---|---|
| CN | 107258067 A | * | 10/2017 | ............. H04J 15/00 |
| CN | 108243453 A | | 7/2018 | |

(Continued)

OTHER PUBLICATIONS

First Office Action for Application No. CN 2018800962900 mailed Nov. 3, 2021, English and Chinese languages (26 pages).

(Continued)

*Primary Examiner* — Parth Patel
(74) *Attorney, Agent, or Firm* — Crowell & Moring LLP

(57) ABSTRACT

A wireless communication method includes a network node that transmits to one or more communication nodes a set of parameters for selection of a multiple access transmission scheme from a plurality of multiple access transmission schemes, such as an orthogonal multiple access (OMA) scheme and a non-orthogonal multiple access (NOMA) scheme. The network node receives data transmitted by a communication node using the multiple access transmission scheme selected by the communication node. The network node can also transmit one or more sets of parameters for one or more transmission configuration groups or a set of parameters for re-transmission, where the transmission configurations group(s) and the parameters for re-transmission define a multiple access transmission scheme to be selected from a plurality of multiple access transmission schemes.

15 Claims, 8 Drawing Sheets

(56) References Cited

U.S. PATENT DOCUMENTS

| | | | |
|---|---|---|---|
| 11,665,702 B2* | 5/2023 | Kim | H04L 5/0094 370/330 |
| 2010/0284292 A1* | 11/2010 | You | H04W 72/51 370/252 |
| 2013/0272281 A1* | 10/2013 | Xu | H04L 1/1896 370/336 |
| 2014/0050187 A1* | 2/2014 | Nakshima | H04L 25/03898 370/329 |
| 2014/0314006 A1* | 10/2014 | Suh | H04B 7/0452 370/329 |
| 2015/0043540 A1* | 2/2015 | Nikopour | H04W 72/23 370/335 |
| 2015/0312074 A1* | 10/2015 | Zhu | H04L 1/0026 370/329 |
| 2016/0219529 A1* | 7/2016 | Benjebbour | H04W 72/23 |
| 2016/0330695 A1* | 11/2016 | Benjebbour | H04L 1/0009 |
| 2018/0070274 A1* | 3/2018 | Ode | H04L 5/0053 |
| 2018/0160372 A1* | 6/2018 | Benjebbour | H04W 72/23 |
| 2018/0317198 A1* | 11/2018 | Lee | H04W 4/70 |
| 2018/0376409 A1* | 12/2018 | Tani | H04W 72/54 |
| 2019/0029031 A1* | 1/2019 | Kumar | H04W 72/21 |
| 2019/0045489 A1* | 2/2019 | He | H04W 72/12 |
| 2019/0223225 A1* | 7/2019 | Lee | H04W 72/0466 |
| 2019/0349169 A1* | 11/2019 | Nammi | H04L 5/0023 |
| 2019/0356423 A1* | 11/2019 | Lee | H04L 5/0082 |
| 2019/0363843 A1* | 11/2019 | Gordaychik | H04L 1/08 |
| 2020/0029270 A1* | 1/2020 | Matsuda | H04J 99/00 |
| 2020/0053789 A1* | 2/2020 | Lee | H04W 74/0833 |
| 2020/0127778 A1* | 4/2020 | Zhuang | H04W 28/0205 |
| 2020/0296699 A1* | 9/2020 | Matsuda | H04L 5/0007 |
| 2020/0322994 A1* | 10/2020 | Tian | H04W 76/27 |
| 2020/0413413 A1* | 12/2020 | Haghighat | H04W 72/53 |
| 2021/0036831 A1* | 2/2021 | Utkovski | H04L 5/0053 |
| 2021/0045181 A1* | 2/2021 | Li | H04W 72/23 |
| 2021/0067300 A1* | 3/2021 | Pan | H04B 17/309 |
| 2021/0083828 A1* | 3/2021 | Matsuda | H04W 72/04 |
| 2021/0084621 A1* | 3/2021 | Kim | H04W 72/23 |
| 2021/0100002 A1* | 4/2021 | Pan | H04L 5/0051 |
| 2021/0126753 A1* | 4/2021 | Mochizuki | H04L 5/0037 |
| 2021/0135825 A1* | 5/2021 | Pan | H04L 5/0037 |
| 2021/0168850 A1* | 6/2021 | Zhang | H04L 1/1614 |
| 2021/0243777 A1* | 8/2021 | Tsai | H04W 74/006 |
| 2021/0274515 A1* | 9/2021 | Lei | H04W 8/24 |
| 2021/0274559 A1* | 9/2021 | Hwang | H04W 74/0833 |
| 2021/0289546 A1* | 9/2021 | Lee | H04L 5/0053 |
| 2021/0315000 A1* | 10/2021 | Li | H04L 5/0051 |

FOREIGN PATENT DOCUMENTS

| | | | | |
|---|---|---|---|---|
| EP | 3 641 170 A1 | | 4/2020 | |
| EP | 3 720 224 A1 | | 10/2020 | |
| EP | 3 776 989 | | 2/2021 | |
| KR | 20060026301 A | * | 3/2006 | |
| WO | WO 2018/032014 A1 | | 2/2018 | |
| WO | WO2019/154522 | * | 8/2019 | H04W 48/12 |
| WO | WO 2019/154522 A1 | | 8/2019 | |
| WO | WO 2019/195680 A1 | | 10/2019 | |

OTHER PUBLICATIONS

AT&T, "R1-1806981 on NoMA Procedures", *3GPP TSG RAN WG1 Meeting #93*, May 25, 2018 (May 25, 2018), https://portal.3gpp.org/ngppapp/TdocList.aspx?meetingId=18784.

International Search Report and Written Opinion received for Application No. PCT/CN2018/099953 mailed May 8, 2019, (6 pages).

AT&T, "R1-1806981 on NoMA Procedures", *3GPP TSG RAN WG1 Meeting #93*, May 25, 2018 (May 25, 2018).

Samsung, "R1-1804398 Procedures related consideration to NoMA", *3GPP TSG RAN WG1 Meeting #92bis*, Apr. 20, 2018 (Apr. 20, 2018), TDoc (3gpp.org).

Office Action for EP Application No. 18929042.2 dated Feb. 13, 2023 (5 pages).

Extended European Search Report for EP Application No. 18929042.2 dated Feb. 21, 2022 (12 pages).

ZTE: "Considerations on Procedures Related to NoMA", 3GPP Draft; RI-1805842 Considerations on Procedures Related to Noma_Final, 3rd Generation Partnership Project (3GPP), Mobile Competence Cenre; 650, Route Des Lucioles; F-06921 Sophia-Antipolis Cede, vol. RAN WGI, No. Busan, Korea; May 21, 2018-May 25, 2018, May 20, 2018, XP051441062, Retrieved from the Internet: URL:http://www.3gpp.org/ftp/Meetings%5F3GP_P%FSYNC/RAN1/Docs/.

Samsung: "Discussion on NoMA Related Procedure", 3GPP Draft; RI-1806753, $3^{rd}$ Generation Partnership Project (3GPP), Mobile Competence Centre; 650, Route Des Lucioles; F-06921 Sophia-Antipolis Cedex; France, vol. RAN WGI, No. Busan, Korea; May 21, 2018-May 25, 2018, May 20, 2018, XP051441955, Retrieved from the Internet: URL:http://www.3gpp.org/ftp/Meetings%5F3GPP%5FSYNC/RAN1/Docs/.

Examination Report issued for EP Application No. 18 929 042.2 dated Feb. 4, 2025 (6 pp.).

* cited by examiner

MULTIPLE ACCESS TRANSMISSION CONFIGURATIONS

RELATED APPLICATION

This application is a continuation application of PCT Patent Application No. PCT/CN2018/099953 filed Aug. 10, 2018 entitled "MULTIPLE ACCESS TRANSMISSION CONFIGURATIONS," which is incorporated herein by reference in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, further advances the LTE and LTE-A wireless standards and is committed to supporting higher data-rates, large number of connections, ultra-low latency, high reliability and other emerging business needs.

SUMMARY

The disclosed wireless communication methods enhance wireless performance for multiple access technology, such as non-orthogonal multiple access (NOMA).

A first exemplary embodiment discloses a wireless communication method for transmitting, by a network node to one or more communication nodes, a set of parameters for selection of a multiple access transmission scheme from a plurality of multiple access transmission schemes, where the plurality of multiple access transmission schemes includes an orthogonal multiple access (OMA) scheme and a non-orthogonal multiple access (NOMA) scheme. The method also includes receiving, by the network node, data transmitted by a communication node using the multiple access transmission scheme selected by the communication node.

In some implementations of the first embodiment, the multiple access transmission scheme is based on a semi-persistent scheduling grant or a dynamic scheduling grant. In some implementations of the first embodiment, the set of parameters for selection of the multiple access transmission scheme includes at least one of: an indicator to indicate that a first multiple access transmission scheme is enabled or disabled, a maximum number of transmissions, or a time duration to transmit data.

In some implementations of the first embodiment, the network node uses a same system information block to transmit the indicator to the one or more communication nodes. In some implementations of the first embodiment, the system information block includes a single bit or the system information block includes a bitmap that has a length equal to a number of type of communication node supported by the network node.

In some implementations of the first embodiment, the network node uses different system information blocks to transmit the indicator to different types of communication nodes, where each system information block corresponds to a type of communication node. In some implementations of the first embodiment, the network node transmits the set of parameters using a common signal transmitted to the one or more communication nodes or a dedicated signal transmitted to at least one type of communication node. In some implementations of the first embodiment, the type of communication node includes enhanced Mobile Broadband (eMBB), Ultra Reliable Low Latency Communications (URLCC), or massive Machine Type Communications (mMTC).

In some implementations of the first embodiment, the network node transmits the set of parameters for the multiple access transmission scheme to the communication node in response to receiving a request from the communication node.

In some implementations of the first embodiment, the network node receives the first multiple access transmission scheme data from the communication node in response to transmitting the indicator that indicates that the first multiple access transmission scheme is enabled, and the network node receives a second multiple access transmission scheme data from the communication node in response to transmitting the indicator that indicates that the first multiple access transmission scheme is disabled. In some implementations of the first embodiment, the first multiple access transmission scheme includes the NOMA transmission scheme, and the second multiple access transmission scheme includes the OMA scheme.

A second exemplary embodiment discloses a wireless communication method for receiving, by a communication node, a set of parameters for selection of a multiple access transmission scheme from a plurality of multiple access transmission schemes, where the plurality of multiple access transmission schemes includes an orthogonal multiple access (OMA) scheme and a non-orthogonal multiple access (NOMA) scheme. The method also includes transmitting, by the communication node, data to a network node using the multiple access transmission scheme selected by the communication node. In some implementations of the second embodiment, the multiple access transmission scheme is based on a semi-persistent scheduling grant or a dynamic scheduling grant. In some implementations of the second embodiment, the set of parameters for selection of the multiple access transmission scheme includes at least one of: an indicator to indicate that a first multiple access transmission scheme is enabled or disabled, a maximum number of transmissions, or a time duration to transmit data.

In some implementations of the second embodiment, the communication node transmits the first multiple access transmission scheme data to the network node in response to receiving the indicator that indicates that the first multiple access transmission scheme is enabled, and the communication node transmits a second multiple access transmission scheme data to the network node in response to receiving the indicator that indicates that the first multiple access transmission scheme is disabled.

In some implementations of the second embodiment, the communication determines that a number of transmissions to the network node using the first multiple access transmission scheme has exceeded the maximum number of transmissions without reception of a response from the network node, and the communication node transmits, in response to the determining, a second multiple access transmission scheme data.

In some implementations of the second embodiment, the communication node determines after completion of transmission of the first multiple access transmission scheme data, an absence of a response from the network node within the time duration, and the communication node selects, based on the determining, a second multiple access transmission scheme to transmit the data to the network node. In some implementations of the second embodiment, the first multiple access transmission scheme includes the NOMA transmission scheme, and the second multiple access transmission scheme includes the OMA scheme.

In some implementations of the second embodiment, the communication node receives the set of parameters for the multiple access transmission scheme from the network node in response to the communication node transmitting a request to the network node. In some implementations of the second embodiment, the communication node transmits the data while operating in an idle state or an inactive state.

A third exemplary embodiment discloses a wireless communication method for transmitting, by a network node to one or more communication nodes, one or more sets of parameters for one or more transmission configuration groups, where the one or more sets of parameters define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme. The method further includes receiving, by the network node, data transmitted by a communication node using the multiple access transmission scheme selected by the communication node.

In some implementations of the third embodiment, the multiple access transmission scheme is based on a semi-persistent scheduling grant or a dynamic scheduling grant. In some implementations of the third embodiment, each set of parameters for one or more transmission configuration groups includes at least one of: an indication of a resource used to transmit another set of parameters, a number of supported groups, a group identifier, a threshold to select a group, a flag for transmission or re-transmission, a set of parameters for multiple access signature, an indication of reference signals, an indication of resource for transmission, a set of parameters for reference signal generation, a set of parameters for a multiple access signature generation, or a set of parameters to determine the transport block size.

In some implementations of the third embodiment, the set of parameters for multiple access signature includes at least one of: a set of sequences for spreading, a set of sequences for scrambling, a set of parameters for transmission power adjustment, or a set of patterns for resource mapping.

In some implementations of the third embodiment, the network node configures the one or more transmission configuration groups based on at least one of following: each of the transmission configuration groups has a same set of parameters for multiple access signature and a different uplink resource indicator for transmission, each of the transmission configuration groups has a different set of parameters for multiple access signature and a same uplink resource indicator for transmission, each of the transmission configuration groups has a different set of parameters for multiple access signature and different parameters to determine the transport block size, or each of the transmission configuration groups has a same set of parameters for multiple access signature, a same uplink resource indicator for transmission, and a different spatial-relationship configured for the uplink resource associated with each group.

In some implementations of the third embodiment, the network node transmits the set of parameters using a common signal transmitted to the one or more communication nodes or a dedicated signal transmitted to at least one type of communication node. In some implementations of the third embodiment, the type of communication node includes enhanced Mobile Broadband (eMBB), Ultra Reliable Low Latency Communications (URLCC), or massive Machine Type Communications (mMTC). In some implementations of the third embodiment, the network node transmits at least one set of parameters for the one or more transmission configuration groups to the communication node in response to receiving a request from the communication node.

A fourth exemplary embodiment discloses a wireless communication method for receiving, by a communication node, one or more sets of parameters for one or more transmission configuration groups, where the one or more sets of parameters define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme. The method also includes transmitting, by the communication node, data to a network node using the multiple access transmission scheme selected by the communication node. In some implementations of the fourth embodiment, the multiple access transmission scheme is based on a semi-persistent scheduling grant or a dynamic scheduling grant.

In some implementations of the fourth embodiment, the communication node determines that a first multiple access transmission scheme is disabled for transmission in response to: determining an absence of an indication of the one or more transmission configuration groups, or determining an absence of the reception of the one or more sets of parameters for each of the one or more transmission configuration groups, where the communication node uses a second multiple access transmission scheme in response to determining that the first multiple access transmission scheme is disabled. In some embodiments, the first multiple access transmission scheme includes the NOMA scheme, and the second multiple access transmission scheme includes the OMA scheme.

In some implementations of the fourth embodiment, each set of parameters for one or more transmission configuration groups includes at least one of: an indication of a resource used to transmit another set of parameters, a number of supported groups, a group identifier, a threshold to select a group, a flag for transmission or re-transmission, a set of parameters for multiple access signature, an indication of reference signals, an indication of resource for transmission, a set of parameters for reference signal generation, a set of parameters for a multiple access signature generation, or a set of parameters to determine the transport block size.

In some implementations of the fourth embodiment, the set of parameters for multiple access signature includes at least one of: a set of sequences for spreading, a set of sequences for scrambling, a set of parameters for transmission power adjustment, or a set of patterns for resource mapping.

In some implementations of the fourth embodiment, the one or more transmission configuration groups is configured based on at least one of following: each of the transmission configuration groups has a same set of parameters for multiple access signature and a different uplink resource indicator for transmission, each of the transmission configuration groups has a different set of parameters for multiple access signature and a same uplink resource indicator for transmission, each of the transmission configuration groups has a different set of parameters for multiple access signature and different parameters to determine the transport block size, or each of the transmission configuration groups has a same set of parameters for multiple access signature, a same uplink resource indicator for transmission, and a different spatial-relationship configured for the uplink resource associated with each group.

In some implementations of the fourth embodiment, the communication node receives at least one set of parameters for the one or more transmission configuration groups from the network node in response to the communication node transmitting a request to the network node. In some implementations of the fourth embodiment, the communication node transmits the data while operating in an idle state or an inactive state.

A fifth exemplary embodiment discloses a wireless communication method for transmitting, by a network node to one or more communication nodes, a set of parameters for re-transmission, where the set of parameters for re-transmission define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme. The method also includes receiving, by the network node, data transmitted by a communication node using the multiple access transmission scheme selected by the communication node.

In some implementations of the fifth embodiment, the multiple access transmission scheme is based on a semi-persistent scheduling grant or a dynamic scheduling grant. In some implementations of the fifth embodiment, the set of parameters for re-transmission includes an acknowledgement indicator or a non-acknowledgement indicator transmitted using a single downlink control information (DCI) for one or more transmission configuration groups. In some implementations of the fifth embodiment, the set of parameters for re-transmission includes an acknowledgement indicator or a non-acknowledgement indicator transmitted using different downlink control information (DCI) for different transmission configuration groups.

In some implementations of the fifth embodiment, the DCI for each transmission configuration group includes at least one of: a group identifier, a number of bits to indicate the acknowledgement or the non-acknowledgement, a transmission configuration for re-transmission, or a number of bits to indicate a DCI format. In some implementations of the fifth embodiment, the set of parameters for re-transmission includes an acknowledgement indicator transmitted using downlink control information (DCI) to the communication node by the network node performing a scheduling grant. In some implementations of the fifth embodiment, the DCI includes bits for scheduling, or the DCI only includes one or more bits to indicate a DCI format. In some implementations of the fifth embodiment, the one or more bits to indicate the DCI format is encoded with bits to indicate the acknowledgement.

In some implementations of the fifth embodiment, the DCI is scrambled with a radio network temporary identifier (RNTI), where the RNTI is obtained by the network node by performing at least one of following: calculating the RNTI based on an identifier of the communication node sent by the communicated node, calculating the RNTI based on the group identifier of transmission configuration, calculating the RNTI based on identifier of resource for transmission from communication node, calculating the RNTI based on an identifier of a multiple access signature selected by the communication node for transmission, or assigning to the RNTI a pre-determined value for transmission scheme.

In some implementations of the fifth embodiment, the set of parameters for re-transmission includes one or more transmission configurations to be used by the communication node to re-transmit data. In some implementations of the fifth embodiment, the network node transmits the set of parameters using a common signal transmitted to the one or more communication nodes or a dedicated signal transmitted to at least one type of communication node. In some implementations of the fifth embodiment, the type of communication node includes enhanced Mobile Broadband (eMBB), Ultra Reliable Low Latency Communications (URLCC), or massive Machine Type Communications (mMTC). In some implementations of the fifth embodiment, the network node transmits the set of parameters to the communication node in response to receiving a request from the communication node.

A sixth exemplary embodiment discloses a wireless communication method for receiving, by a communication node, a set of parameters for re-transmission, where the set of parameters for re-transmission define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme. The method also includes transmitting, by the communication node, data to a network node using the multiple access transmission scheme selected by the communication node. In some implementations of the sixth embodiment, the multiple access transmission scheme is based on a semi-persistent scheduling grant or a dynamic scheduling grant.

In some implementations of the sixth embodiment, the set of parameters for re-transmission includes an acknowledgement indicator or a non-acknowledgement indicator received in a downlink control information (DCI) for a transmission configuration group.

In some implementations of the sixth embodiment, the communication node determines, after the transmitting of the data, a non-acknowledgment condition in response to not receiving from the network node a scheduling grant via downlink control information (DCI) within a time window. In some implementations of the sixth embodiment, the set of parameters for re-transmission includes one or more transmission configurations to be used by the communication node to re-transmit data.

In some implementations of the sixth embodiment, the communication node selects a re-transmission configuration in response to determining that a transmission of the data using another transmission configuration is associated with a non-acknowledgment condition, where the re-transmission configuration and the transmission configuration belong to a same transmission configuration group, where the communication node selects the re-transmission configuration by performing at least one of following: selecting the re-transmission configuration from the transmission configuration group, or determining the re-transmission configuration based on at least one of following parameters: a step for group re-selection, or a counter for transmission or retransmission, where the set of parameters for re-transmission include the step for group re-selection, or a maximum number of re-transmissions for the counter.

In some implementations of the sixth embodiment, the communication node selects a re-transmission configuration in response to determining that a transmission of the data using a transmission configuration is associated with a non-acknowledgment condition, where the re-transmission configuration and the transmission configuration belong to different transmission configuration groups, and where the communication node selects the re-transmission configuration by performing at least one of following: selecting the re-transmission configuration from all transmission configuration groups, selecting the re-transmission configuration from a transmission configuration group assigned for re-transmission, or determining the re-transmission configuration based on at least one of following parameters: a step for group re-selection, or a counter for transmission or retransmission, where the set of parameters for re-transmission include the step for group re-selection, or a maximum number of re-transmissions for the counter.

In some implementations of the sixth embodiment, the communication node determines different redundancy version (RV) for encoding based on at least one of: a value that indicates a step for RV cycling, or a counter for re-transmission, where the set of parameters for re-transmission include the value or a maximum number of re-transmissions for the counter.

In some implementations of the sixth embodiment, the communication node selects a resource based on at least one of: a step in time domain, a step in frequency domain, or a counter of transmission or retransmission, where the set of parameters for re-transmission include the step in time domain, the step in frequency domain, or a maximum number of re-transmissions for the counter. In some implementations of the sixth embodiment, the communication node determines to increase or decrease power based on at least one of: a value that indicates an amount by which to ramp power, a counter for re-transmission, where the set of parameters for re-transmission include the value or a maximum number of re-transmissions for the counter.

In some implementations of the sixth embodiment, the communication node receives the set of parameters from the network node in response to the communication node transmitting a request to the network node. In some implementations of the sixth embodiment, the communication node transmits the data while operating in an idle state or an inactive state.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
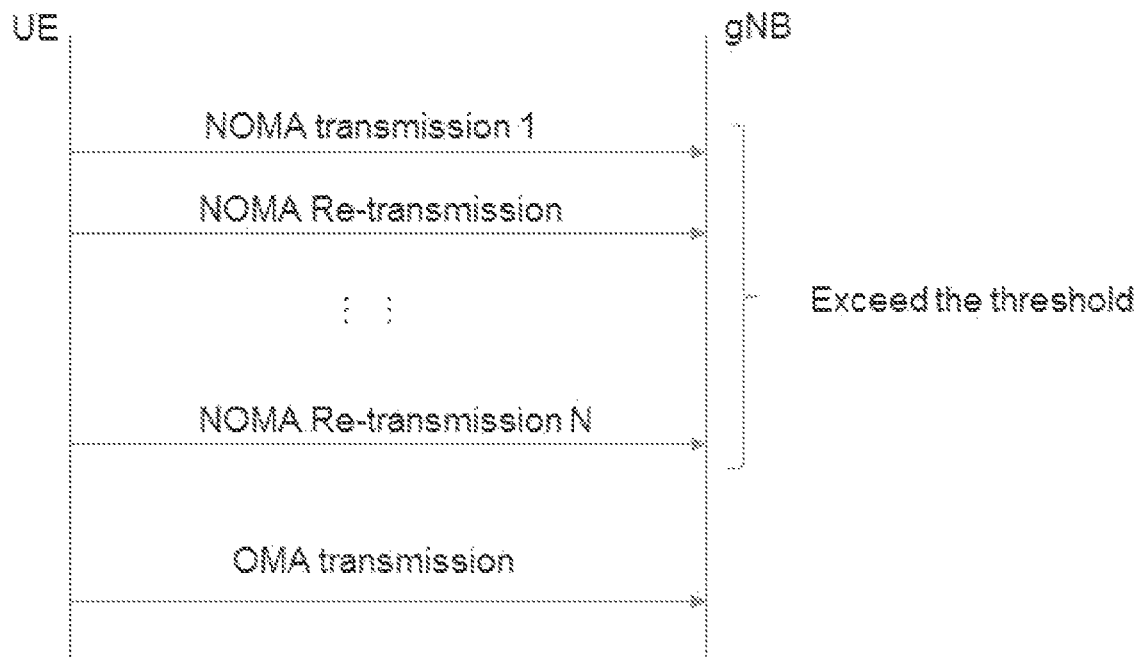
FIG. 1 shows a diagram for an implicit technique to perform re-transmissions using a number of transmission.

Conventional wireless technology uses techniques such as time division multiple access (TDMA) or orthogonal frequency division multiple access (OFDMA) where a single user can access an orthogonal resource block, such as a time slot or a frequency channel. In contrast, non-orthogonal multiple access (NOMA) is a technology that can be employed in 5G wireless networks to serve more than one user in each orthogonal resource block. However, the use of NOMA technology raises at least two issues.

First, the performance of NOMA technique is impacted by number of user equipment (UE) which conduct simultaneous transmission on a same resource (e.g., time-frequency resource) pool of multiple access (MA) signature. The probability of MA signature (or MA set of parameters) collision will increase if the ratio between number of UE and size of MA signature increases. The collision among UEs with same MA will degrade the SINR for each UE as well as the traffic load. From the network side, if a communication system is designed with fixed traffic load, e.g., limited number of MA signature, the supported number of UE will be reduced, and the benefits of NOMA to serve the massive Machine Type Communications (mMTC) case will diminish. However, introducing the pool of MA signature with infinite size is not realistic and the complexity for base station gNB for blind decoding will also dramatically increased once the size of MA and the resource for possible UL transmission is enlarged.

Thus, in Sections I and II, this patent document describes techniques to configure or indicate the transmission configuration including the MA signature to the UE for NOMA transmission. In some embodiments, the configuration or indication of the transmission configuration to UE for NOMA transmission in either Radio Resource Control (RRC)-inactive mode or idle mode is optimized to achieve the tradeoff between performance and implementation complexity at gNB side. In some embodiments, the configuration or indication of the transmission configuration to UE for NOMA transmission in RRC connected mode can also be optimized.

Second, using an existing technique, a UE operating in an RRC-connected mode can be scheduled by UE-specific DCI for re-transmission. However, when a UE is in an idle state or RRC inactive state, the UE identifier may not be detected by gNB due to the potential collision of MA signature or the UE is detected but the corresponding data is failed to be decoded due to worse SINR condition. Thus, in Section III.a. this patent document describes techniques to indicate the acknowledgement (ACK) or non-acknowledgment (NACK) status to UE for the NOMA transmission without UE specific configuration or when UE is in idle state or RRC inactive state.

Furthermore, for the re-transmission, normal UE in RRC connected mode will be scheduled via the UE-specific DCI, with corresponding modulation coding scheme (MCS) and resource. However, for the NOMA UE in idle or RRC inactive mode, the UE-specific optimization is not feasible since the UE may not be detected. Thus, in Section III.b. this patent document describes some example mechanisms or rules to assist the re-transmission for each UE, once the previous transmission is assumed with NACK.

Section headings are used in the present document to improve readability and do not limit the embodiments and techniques described in a section to that section only. According, one or more features from one section may be used or implemented in another section.

I. Configuration of Multiple Access Scheme a. Enabling or Disabling NOMA Transmissions Section I.a. describes techniques to enable or disable a NOMA transmission for a UE using an implicit approach or using an explicit approach. An implicit approach is further described below in the second embodiment of Section I where a NOMA transmission is enabled or disabled without configuring the corresponding transmission configuration in the signaling.

A first embodiment describes an explicit approach to enable or disable a NOMA transmission. The explicit approach includes a gNB transmitting to one or more UEs a set of parameters to select a multiple access transmission scheme from a plurality of multiple access transmission schemes, such as an OMA scheme and a NOMA scheme. In some embodiments, the multiple access transmission scheme may be based on a semi-persistent scheduling grant or may be based on a dynamic or normal scheduling grant. The NOMA scheme may include a normal NOMA scheme or a random NOMA scheme. For example, the set of parameters to select the multiple access transmission scheme includes an indicator that indicates whether a UE's transmissions using non-orthogonal multiple access (NOMA) is supported (e.g., enabled) or not supported (e.g., disabled). If NOMA is disabled then OMA is enabled. In the first embodiment, the MA signature or set of parameters includes the indicator. The indicator may be included in a system information block. In some embodiments, the gNB may transmit to one or more UEs an indicator that indicates whether a UE's transmissions using orthogonal multiple access (OMA) is supported (e.g., enabled) or not supported (e.g., disabled). If OMA is disabled, then NOMA is enabled.

In some implementations for the first embodiment, the indicator is separate for each UE terminal type and transmitted in a same system information block for all UE types within a transmission range of a gNB. For example, a gNB may transmit to the one or more UE terminal types a same system information block that includes a bitmap with the indicator. The bitmap has a length equal to number of UE terminal types supported by the gNB. The bitmap in another example, the gNB may transmit to the one or more UE terminal types a same system information block that includes a single bit to indicate whether or not NOMA transmission is supported without distinguishing the UE types. The UE terminal type can include enhanced Mobile Broadband (eMBB), Ultra Reliable Low Latency Communications (URLCC), or massive Machine Type Communications (mMTC).

In some other implementations for the first embodiment, the indicator is separate for each UE terminal type and transmitted in different system information block. For example, a network node may use a first system information block to send information to one or more UEs belonging to a first UE type and the network node may use a second system information block to send information to one or more UEs belonging to a second UE type. The system information blocks can be dedicated to different type of UE, and the UE can be categorized by service.

For the first embodiment, the system information block can be transmitted via gNB either periodically or based on request of UE. In implementations where the indicator is separate for each UE terminal type and transmitted in different system information block, if the system information block is transmitted based on UE request, then only the corresponding information is transmitted. For example, once the UE requests whether NOMA is supported, the gNB transmits to the UE the SIB to indicate whether NOMA is supported. Further, if the request is made by one of type UE, the gNB will transmit the dedicated SIB designed for that type of UE.

In some embodiments, a network node can transmit a parameter, such as the indicator, to a type of UEs in response to receiving a request from a UE belong to the type of UE. In some embodiments, a network node can transmit a parameter to multiple types of UEs in response to receiving a request from UEs belonging to multiple types of UEs. In some embodiments, a network node can transmit a parameter to multiple types of UEs in response to receiving a request from a UE belonging to a type of UE. The NOMA transmission is enabled by gNB from network perspective, for each UE, whether the UE transmits in NOMA depends on the UE capability.

b. Switching between OMA and NOMA

A second embodiment describes a switching between OMA and NOMA for a UE. In an implementation for the second embodiment is shown in FIG. 1 that describes an implicit rule via the number of transmission. For example, as shown in FIG. 1, if the UE determines that the number of transmissions or re-transmissions using NOMA exceeds the pre-configured value N without reception of a response from the network node, the UE will select an OMA scheme to try to access the network via the OMA scheme. A network node can indicate to the one or more user equipment's a number of maximum supported transmissions.

Figure 2:
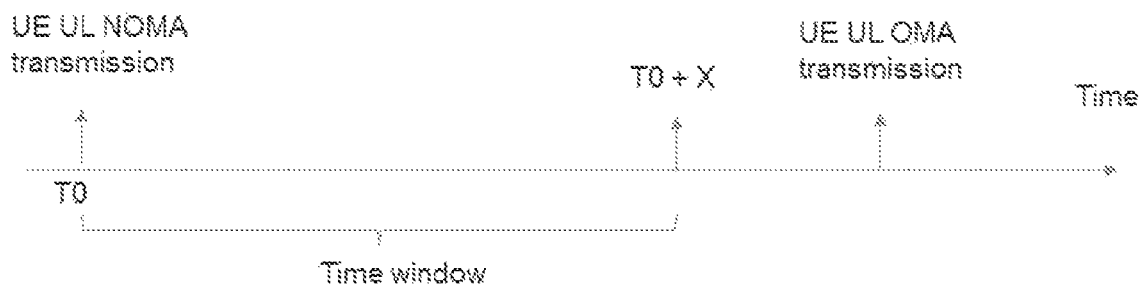
FIG. 2 shows a diagram for a timer for non-orthogonal multiple access (NOMA) transmission.

Another implementation for the second embodiment is shown in FIG. 2 that describes a timer for NOMA transmission. When the UE determines that the timer has expired before completing transmission of data using NOMA, the UE selects an OMA scheme and will transmit to the network node using the OMA scheme. When the UE determines that the NOMA transmission has been completed, the UE will reset the timer. In some embodiments, a length of the timer is the same as a time window, where information about the time window is sent by the network node to the one or more user equipment. The time window may be a pre-defined time unit, e.g., a slot or a frame. For embodiments involving a time window, the start time of the time window will include the next NOMA transmission. In such embodiments, the timer or time window may be reset when an ACK is received by UE from gNB for a new NOMA transmission within the time window.

Another implementation for the second embodiment includes the gNB directly indicating to the UE whether NOMA is enabled or disabled. For example, if the gNB indicates a configured grant with RRC signaling, then NOMA is enabled. If the gNB indicates a normal scheduling with RRC signaling, then OMA is enabled.

II. Configuration of Multiple Access (MA) Signature

In some embodiments, a gNB signals a set of parameters to indicate K groups of transmission configuration to M UEs, where K and M are greater than or equal to 1. The set of parameters that indicate K groups of transmission configuration may define a multiple access transmission scheme to be selected by the UE from a plurality of multiple access transmission schemes, such as an OMA scheme and a NOMA scheme. In some embodiments, the multiple access transmission scheme may be based on a semi-persistent scheduling grant or may be based on a dynamic or normal scheduling grant. The MA signature includes the K groups of transmission configuration. A number of transmission configurations are included within each group of transmission configuration. For instance, the number of transmission configuration for the kth group can be denoted as L_k, where L is greater than or equal to 1. The transmission configuration(s) for each group includes any one or more of (i) MA signature, (ii) uplink (UL) resource, (iii) Reference Signal (RS) configuration, or (iv) mapping. The MA signature includes sequence for spreading or sequence for scrambling, transport block size (TBS), power allocation, or resource element (RE) mapping. The RS configuration includes a RS port, or parameter(s) for RS generation, e.g., parameters for initialization. The mapping includes relationship between UL resource and MA signature for a group.

a. Signaling
A: Signaling of the Configuration
A-1: Content of Signaling
Example Case 1: Hierarchical Signaling An exemplary embodiment discloses a hierarchical signaling method for the gNB to signal the set of parameters for the K groups of transmission configuration to M UEs. In the first level of signaling, at least one of the following content is included in the set of parameters: (i) an indication of a resource used to transmit a second level of signaling; (ii) the number of supported groups; (iii) the identifier (ID) for the group; (iv) the threshold for group selection, including e.g., RSRP/RSRQ, SINR; (v) the flag for transmission or re-transmission; (vi) a set of parameters for MA signature; (vii) an indication of reference signals; (viii) an indication of resource for transmission; (ix) a set of parameters for RS generation; (x) a set of parameters for MA signature generation; or (xi) a set of parameters to determine the transport block size.

Regarding (i) in the Example Case 1 above, the indication of the resource may be only used once the transmission configuration group is signaled in multiple-level signaling. After the transmission configuration group is signaled as part of the first level signaling, at least the indication of resource which is used to transmit the second signaling including another set of parameters can be signaled. Further, the indication of the resource (described in (i) above) can be a direct indication of time-frequency resource, e.g., bitmap or periodicity and offset. In some embodiments, the indication of the resource (described in (i) above) can also be the indication of resource for a set of control information (e.g., DCI), which is used to schedule the transmission of the second level of signaling.

Regarding (vi) in Example Case 1 above, since the pool of MA signature and RS may be large enough, for the signaling part, the set of parameters to indicate MA signature can include index so that a UE can refers to a MA signature based on the index received via this indicator. In some embodiments, the set of parameters for MA signature may include at least one of: a set of sequences for spreading, a set of sequences for scrambling, a set of parameters for transmission power adjustment, or a set of patterns for resource mapping. Regarding (ix) in Example Case 1 above, parameters for RS generation may include, for example, value for sequence initialization or value to resource allocation. Regarding (x) in Example Case 1 above, parameters for MA signature generation may include, for example, a sequence length, or types (including elements of sequence generated from X-QAM, elements of sequence consist of 1 and 0 only with equally distribution or not). Regarding (xi) in Example Case 1 above, parameter to determine the transport block size may include, for example, modulation order or code-rate In some embodiments that include all groups, in the second level of signaling, at least the following content is included: the detailed content of one or more transmission configuration groups with corresponding one or more group indexes. Thus, in case of multiple level signaling, the first level of signaling can refers to the index, and the second level of signaling can include the detailed content corresponding to index listed in first level. Next, if the ID for specific group is indicated in first level signaling, the UE can adopt the corresponding transmission configuration for this group. Otherwise, the UE can select one of the groups based on pre-defined rule for group selection, e.g., RSRP.

In some embodiments that include one group, in the second level of signaling, at least the following content is included: the detailed contention of kth transmission configuration, where the kth group refers to the group with the ID indicated in the first level of signaling. Next, the UE can use the obtained configuration for transmission.

In some embodiments, when a communication node determines that it has not received the set of parameters described in Section II.a., then the communication node can transmit the data to the network node using a default transmission scheme, such as an OMA scheme. For example, a communication node may determine that a NOMA scheme is disabled for transmission if the communication node (i) determines an absence of an indication of the one or more transmission configuration groups, or (ii) determines an absence of the reception of the one or more parameters for each of the one or more transmission configuration groups. The communication node may use a default transmission scheme in response to the NOMA scheme being disabled.

Example Case 2: Single Signaling

An exemplary embodiment discloses a single signaling method for the gNB to signal the set of parameters for the K groups of transmission configuration to M UEs. In the single signaling, at least one of the following content is included in the set of parameters: (i) the number of supported groups; (ii) the identifier (ID) for the group; (iii) the threshold for group selection, including e.g., RSRP/RSRQ, SINR; (iv) the detailed contention of K transmission configuration with corresponding group index; or (v) the detailed contention of kth transmission configuration, here the kth group refers to the group with the ID indicated in the first level of signaling A-2: Ways of Signaling In some embodiments, for Sections I-III, the following common or dedicated signals may be used to signal the configuration (e.g., MA signature) to the one or more user equipment: (i) broadcast signal; (ii) single system information; (iii) multiple system information; or (iv) RRC signal. Common signals may include broadcast signals and refer to signals that are to be received and detected by all types of UEs. Dedicated signals refer to each signal that is configured for a certain type or types of UEs.

b. Grouping of Transmission Configuration

In an exemplary embodiment, the transmission configuration group information can be provided by using a reference signal. An example of a reference signal includes a demodulation reference signal (DM-RS) or preamble initialization that can be associated with group ID to reduce the detection complexity.

In some embodiments, each group can have a same MA signature or set of parameters but can be associated with different UL resource. In such embodiments, the following two example cases may be used:

Example Case 1: Each group can have the same MA signature, but has different indicator of an uplink resource for transmission. The indicator for the uplink resource for transmission can indicate a time division multiplexed (TDM) UL resource or frequency division multiplexed (FDM) UL resource. In this example case, the UL resource is used for above 6 GHz with beam sweeping or multiple simultaneously beams or below 6 GHz.

Example Case 2: Each group can have the different MA signature with an indicator that indicates a same UL resource.

Example Case 3: Each group can have the same MA signature with an indicator that indicates a same UL resource, but with different spatial-relationship configured for the uplink resource associated with each group. The UL transmission may be based on corresponding spatial relationship with each group. In this example case, the UL resource can be used for above 6 GHz.

Example Case 4: In some other embodiments, each group can have a different MA signature with different parameters for TBS determination, but can be associated with same UL resource (e.g., a same uplink resource indicator for transmission). In such embodiments, as further explained below, the K groups can have (i) only one signature that is different between each group, or (ii) a combination of multiple signatures between the groups. Regarding (i) in Section II.b above, for example, between each group, only one of the following MA signature can be different: sequence length, sequence types, correlation properties, power allocation, transport block size (TBS), or resource element (RE) mapping pattern. Regarding (ii), for example, the groups can have different TBS together with different sequence length (e.g., large TBS with short sequence for SF, or small TBS with long sequence for SF), or the groups can have different TBS together with different power allocation (e.g., large power allocation with large TBS, or small power allocation with small TBS).

III.a. Hybrid ARQ (HARQ):

A first embodiment of Section III.a. includes a set of parameters to indicate a re-transmission scheme sent by the gNB to the UE(s) that may include an explicit HARQ indication for a group of UEs. For example, ACK/NACK is indicated for group of transmission configuration (discussed above in Section II). The set of parameters that indicate a re-transmission scheme may define a multiple access transmission scheme to be selected by the UE from a plurality of multiple access schemes, such as an OMA scheme and a NOMA scheme. In some embodiments, the multiple access transmission scheme may be based on a semi-persistent scheduling grant, or may be based on a dynamic or normal scheduling grant.

Figure 3:
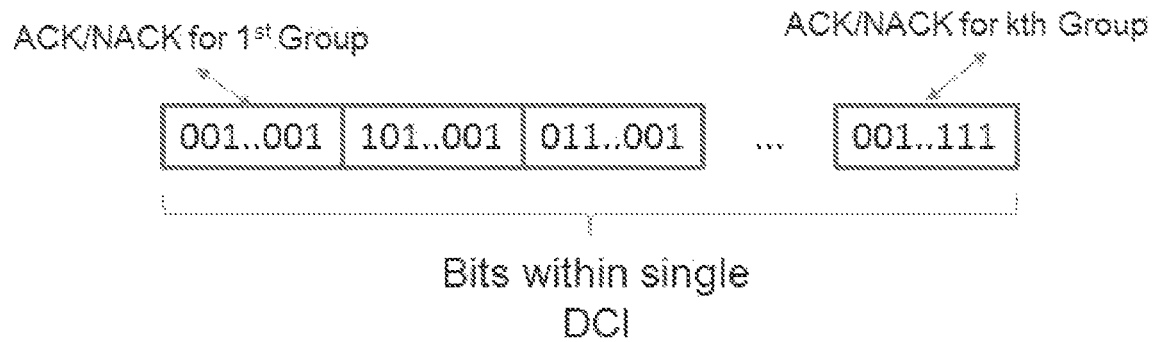
FIG. 3 shows an example of acknowledgment (ACK) or non-acknowledgment (NACK) for all transmission configuration groups being indicated via single DCI.
Figure 4:
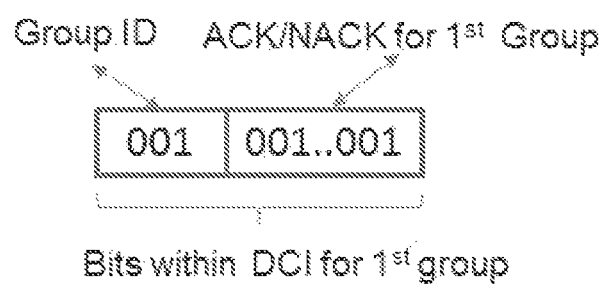
FIG. 4 shows an example of a downlink control information (DCI) format used to distinguish the DCI for each group.

In some embodiments, as shown in FIG. 3, the ACK/NACKs for all transmission configuration groups are indicated via single DCI. For example, the ACK/NACK bits for each group may be cascaded for each group where the length of ACK/NACK bits for each group is determined by the number of supported MA signatures;

In some other embodiments, the ACK/NACKs for each transmission configuration group are indicated via different DCI. For example, the ACK/NACK for a first transmission configuration group is indicated via a first DCI and the ACK/NACK for a second transmission configuration group is indicated via a second DCI. For embodiments where the ACK/NACKs for each group are indicated via different DCI, at least the following two example solutions can be considered:

Example Solution 1: FIG. 4 shows an example of a DCI format used to distinguish the DCI for each group. The DCI for each group can be distinguished via the content, the resource can be either overlapped or not, e.g., randomly. For each DCI, at least one of the following content is included: (i) X bit for the group ID, where X is determined by max(1, ceil(log(K))), where K refers to a number of transmission configuration groups (discussed above in Section II); (ii) Y_k bits for ACK/NACK, where, the Y_k refers to the number of supported MA signatures within kth group (discussed above in Section II); transmission configuration for re-transmission, which can be either ID of TCI configuration in configuration listed in Section II or detailed content; or (iv) a number of bits to indicate a DCI format.

Figure 5:
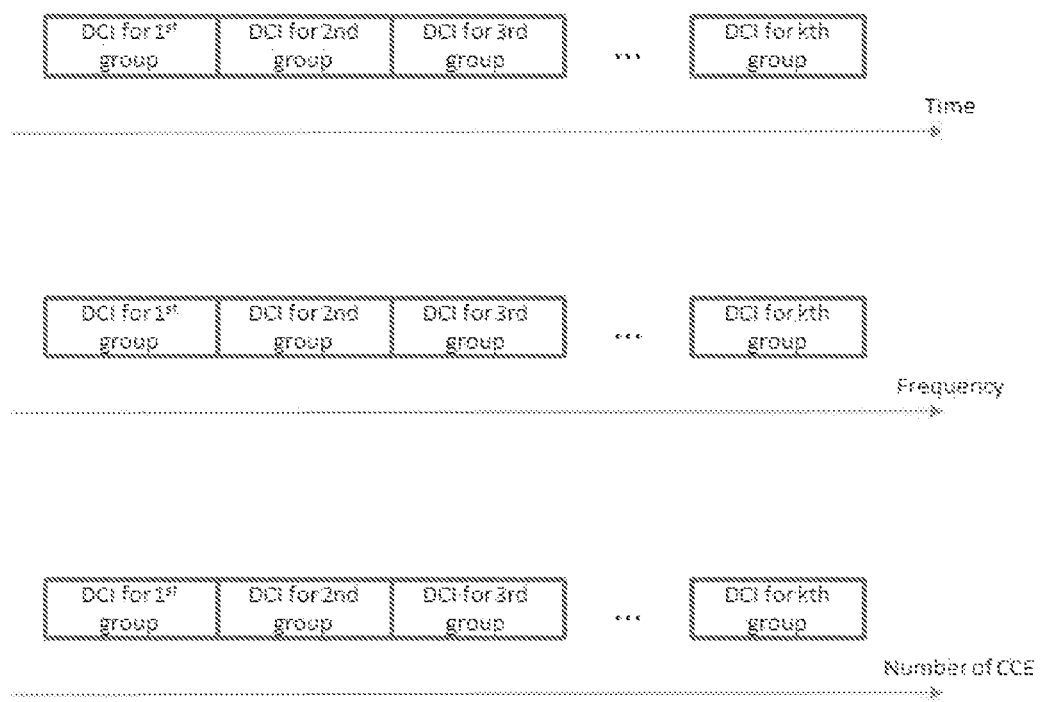
FIG. 5 shows an example of a DCI format used to distinguish the DCI for each group.

Example Solution 2: FIG. 5 shows another example of a DCI format used to distinguish the DCI for each group. In FIG. 5, the DCI for each group is distinguished via resource allocation. For each DCI, at least one of following content is included: (i) X bit for the group ID, where X is determined by max(1,ceil(log(K))), where K refers number of transmission configuration group (discussed in Section II); (ii) bits for DCI format; or (iii) transmission configuration for re-transmission, which can be either ID of TCI configuration in configuration listed in Section II or detailed content. The allocated resource for each DCI can be determined by considering the IDs. For example, as shown in FIG. 5, the allocated resource can be cascaded in either time or frequency domain, or the allocated resource can be an interleaved pattern considering the IDs.

Figure 6:
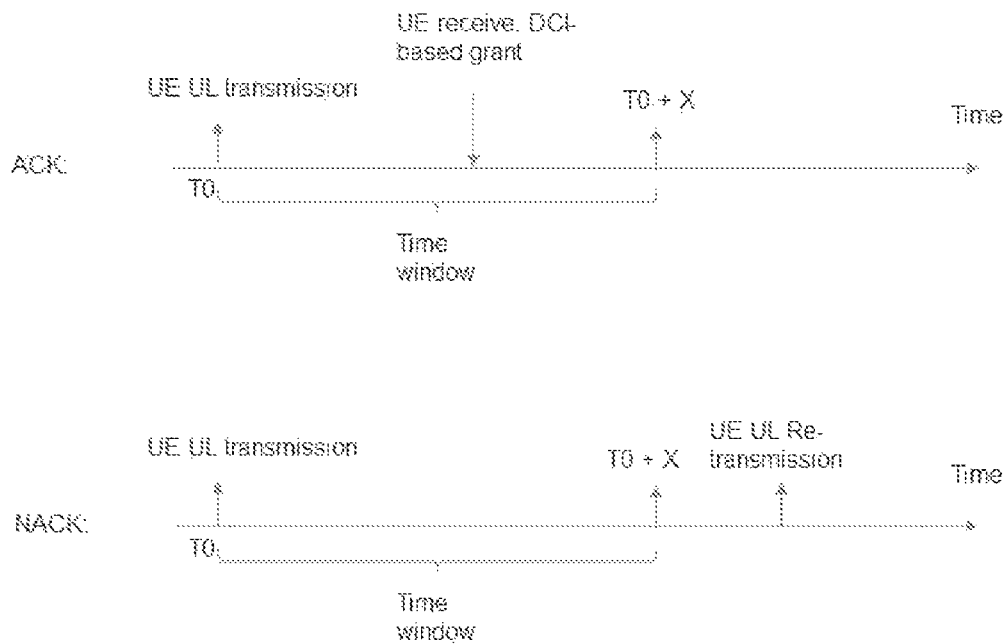
FIG. 6 shows an implicit hybrid automatic repeat request (HARQ) technique.

FIG. 6 shows an implicit HARQ technique for a second embodiment of section III.a. For example, ACK is indicated by the network node using the following scheduling grant (e.g., DCI based grant in FIG. 6) for each UE—transmitted in common search space within pre-defined time window or timer. Two formats may be used. Example format 1 includes fallback DCI with bits for scheduling; and example format 2 includes a simplified DCI only with one or more bits for DCI format. In example format 2, the bits for ACK is jointly encoded with format indicator.

A common design may be used for the two example formats 1 and 2, and for a single or different DCI used for the transmission configuration groups. For example, DCI may be scrambled with X-RNTI. Radio Network Temporary Identifier (RNTI) can be calculated based on reported UE ID, e.g., TMIS, or part of TMIS. The network node may obtain an RNTI value by performing at least one of following: calculating the RNTI based on an identifier of the communication node sent by the communicated node, calculating the RNTI based on the group identifier of transmission configuration, calculating the RNTI based on identifier of resource for transmission from communication node, calculating the RNTI based on an identifier of a multiple access signature selected by the communication node for transmission, or assigning to the RNTI a pre-determined value for transmission scheme. In some embodiments, the RNTI for NOMA has a pre-determined value known to both the gNB and UE. The network node may obtain the RNTI using the above described operations for a single DCI for all transmission configuration groups, for different DCI for each transmission configuration group, or for a DCI dedicated to single communication node performing a scheduling grant.

Multiple-Power ramping steps for one HARQ indication, where the HARQ indication is related to the preamble ID.

Figure 7:
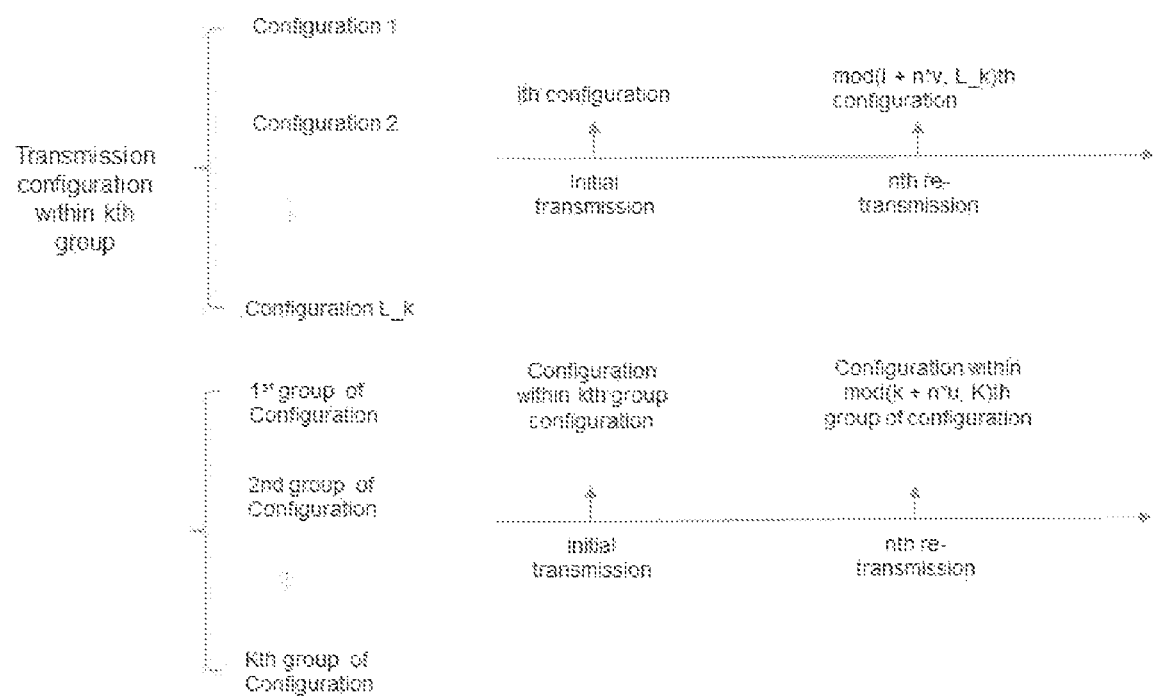
FIG. 7 shows examples of re-transmission techniques with updated configuration.

NACK is indicated if UE has not got the scheduling grant within the pre-defined time window or after a timer has expired III.b. Retransmission FIG. 7 shows examples of re-transmission techniques with updated configuration for embodiments in Section III.b. A first embodiment of Section III.b. describes cycling or choosing of transmission configuration where one or more transmission configurations for re-transmission may be indicated by the gNB to the UE(s) as part of a set of parameters for a re-transmission scheme. The set of parameters that indicate a re-transmission scheme may define a multiple access transmission scheme to be selected by the UE from a plurality of multiple access transmission schemes, such as an OMA scheme and a NOMA scheme. In some embodiments, the multiple access transmission scheme may be based on a semi-persistent scheduling grant, or may be based on a dynamic or normal scheduling grant.

In some embodiments, the UE can cycle or chose transmission configuration within a same group. For example, if a UE determines an explicit or an implicit NACK (as described in this patent document) for a transmission made using a transmission configuration, then the UE can choose a re-transmission configuration, where the transmission and the re-transmission configurations are from the same group of transmission configurations. In this example, the re-transmission configuration may be determined using at least one of following parameters: (i) cycle or group re-selection step v, or (ii) counter for the re-transmission: n, n<=N, where N refers to the maximum allowed number for re-transmission. In some embodiments, the retransmission configuration may be randomly selected by the communication node from a group of transmission configurations. The transmission and re-transmission configurations refer to MA signature that may be indicated within each group of transmission configurations. For this embodiment of Section III.b, the gNB may indicate to at least one communication node the cycle step v or the maximum number of re-transmissions for the counter using the set of parameters for a re-transmission scheme.

FIG. 7 shows an example formula used to calculate the index of transmission configuration. The index for re-transmission configuration (I) can be determined by calculating the following: $I=mod(k+n*v, L\_k)$, where, I refer to the index for re-transmission configuration, k is for initial transmission configuration, n is the counter, v is the step for re-selection, and L_k refers to total number of transmission configuration (MA) within one group.

In some other embodiments, the UE can cycle or choose transmission configuration between different groups. For example, if a UE determines an explicit or an implicit NACK (as described in this patent document) for a transmission made using a transmission configuration, then the UE can choose a re-transmission configuration, where the transmission and re-transmission configurations are from different groups of transmission configurations. In this example, the second transmission configuration is determined using at least one of following parameters: (i) cycle step u; or (ii) counter for the re-transmission: n, n<=N, where N refers to the maximum allowed number for re-transmission. For this embodiment of Section III.b, the gNB may indicate to at least one communication node the cycle step u or the maximum number of re-transmissions for the counter using the set of parameters for a re-transmission scheme. In some embodiments, the retransmission configuration may be selected by the communication node from all of the groups of transmission configurations. In some embodiments, the re-transmission configuration can be selected from a transmission configuration group assigned for re-transmission. A network node can configure a group for retransmission by indicating to a communication node, using a flag for re-transmission, that a group is assigned for re-transmission.

In some embodiments, the cycling within group and across group can be combined together. The calculation of updated index of configuration for transmission is shown on the right-hand side of FIG. 7 as an example.

A second embodiment of Section III.b. describes hopping of UL resource by a UE, which is determined using at least one of following parameters: (i) hopping parameter delta_t (Time domain); (ii) hopping parameter delta_f (Frequency domain); or (iii) counter for transmission or re-transmission: n, n<=N, where N refers to the maximum allowed number for re-transmission. For the second embodiment of Section III.b, the gNB may indicate to at least one communication node the hopping parameter delta_t, the hopping parameter delta_f, or the maximum number of re-transmissions for the counter using the set of parameters for a re-transmission scheme.

A third embodiment of Section III.b. describes a dedicated MA signature or resource for re-transmission (described in Section II). If a dedicated MA signature is configured, then at least one group of configurations is dedicated to be used for re-transmission.

A fourth embodiment of Section III.b describes power ramping (e.g., increasing or decreasing of power) by a UE, which is determined using at least one of following parameters: (i) Power ramping step delta_p; or (ii) counter for the re-transmission: n, n<=N, where N refers to the maximum allowed number for re-transmission. For the fourth embodiment of Section III.b, the gNB may indicate to at least one communication node the power ramping step or the maximum number of re-transmissions for the counter using the set of parameters for a re-transmission scheme.

Configuration of above parameters (e.g., delta_t or delta_p) can be performed using: (i) an updated pattern that is indicated via by gNB together with the explicit HARQ (as described in Section III.a. for explicit HARQ), or (ii) a predefined value and steps in case of implicit HARQ (as described in Section III.a. for implicit HARQ)

A fourth embodiment of Section III.b describes redundancy version (RV) cycling, which is used when the dedicated resource for re-transmission is configured. For example, a communication node may determine different redundancy version (RV) for encoding based on at least one of value that indicates a step for RV cycling, or a counter for re-transmission. In this example, the set of parameters for re-transmission transmitted by the network node include the value or a maximum number of re-transmissions for the counter.

Figure 8:
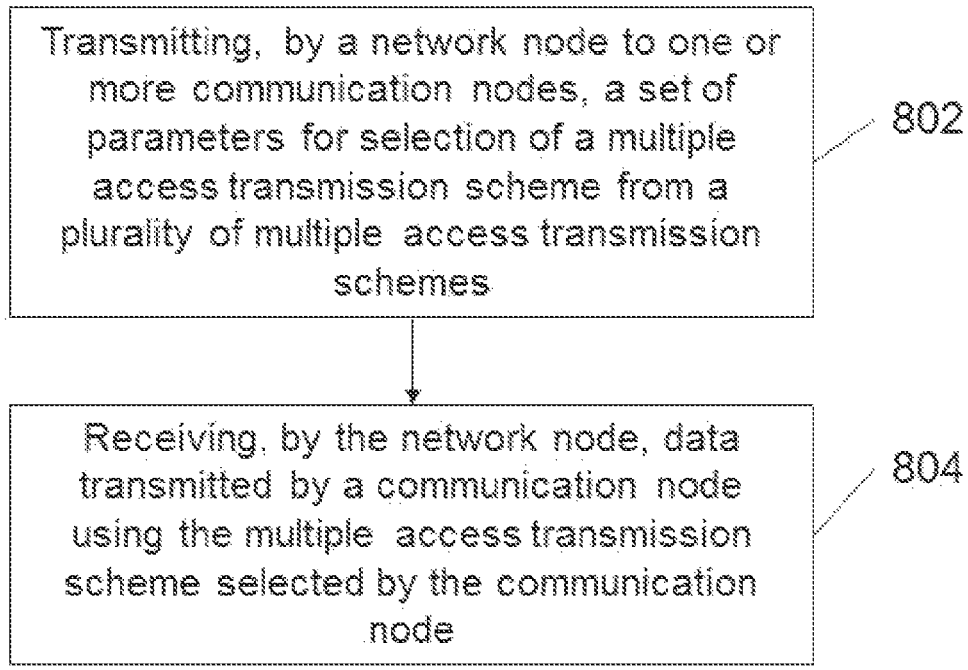
FIG. 8 shows an example flowchart for a network node to transmits a set of parameters for a multiple access transmission scheme.

FIG. 8 shows an example flowchart for a network node to transmits a set of parameters for a multiple access transmission scheme. At the transmitting operation 802, the network node transmits to one or more communication nodes a set of parameters for selection of a multiple access transmission scheme from a plurality of multiple access transmission schemes. The plurality of multiple access transmission schemes includes an orthogonal multiple access (OMA) scheme and a non-orthogonal multiple access (NOMA) scheme. In some embodiments, the multiple access transmission scheme may be based on a semi-persistent scheduling grant or may be based on a dynamic or normal scheduling grant. The set of parameters for selection of the multiple access transmission scheme may include at least one of: an indicator to indicate that a first multiple access transmission scheme is enabled or disabled, a maximum number of transmissions, or a time duration to transmit data.

In some embodiments, the network node uses a same system information block to transmit the indicator to the one or more communication nodes. In an implementation, the system information block includes a single bit or the system information block includes a bitmap that has a length equal to a number of type of communication node supported by the network node. In another implementation, the network node uses different system information blocks to transmit the indicator to different types of communication nodes, where each system information block corresponds to a type of communication node.

In some embodiments, the network node transmits the set of parameters using a common signal transmitted to the one or more communication nodes or a dedicated signal transmitted to at least one type of communication node. The type of communication node may include enhanced Mobile Broadband (eMBB), Ultra Reliable Low Latency Communications (URLCC), or massive Machine Type Communications (mMTC).

In some embodiments, the network node transmits the set of parameters for the multiple access transmission scheme to the communication node in response to receiving a request from the communication node.

In some embodiments, the network node receives the first multiple access transmission scheme data from the communication node in response to transmitting the indicator that indicates that the first multiple access transmission scheme is enabled, and the network node receives a second multiple access transmission scheme data from the communication node in response to transmitting the indicator that indicates that the first multiple access transmission scheme is disabled. In an implementation, the first multiple access transmission scheme includes the NOMA transmission scheme, and the second multiple access transmission scheme includes the OMA scheme At the receiving operation 804, the network node receives data transmitted by a communication node using the multiple access transmission scheme selected by the communication node.

Figure 9:
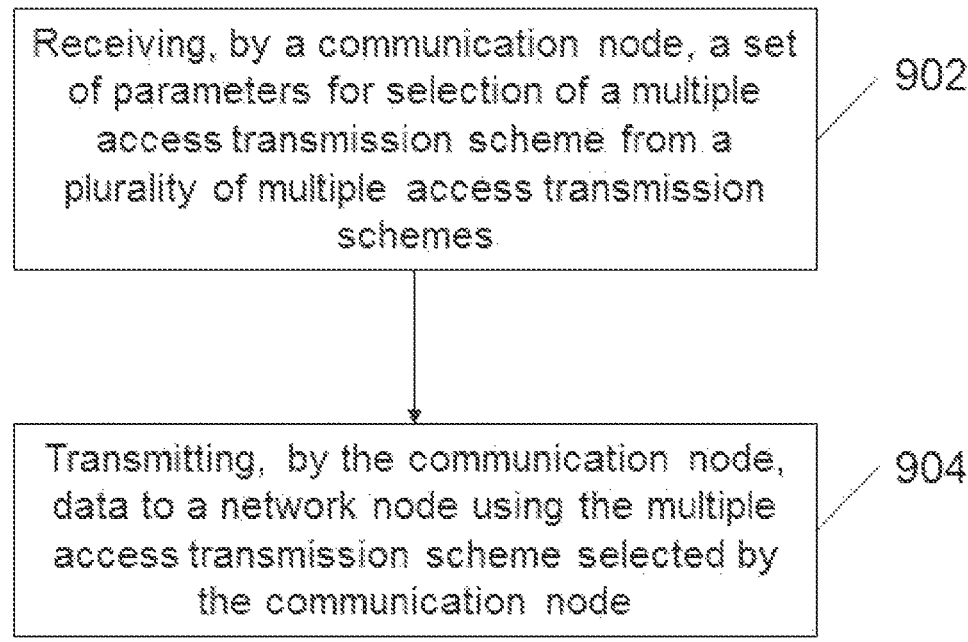
FIG. 9 shows an example flowchart for a communication node to receive a set of parameters for selection of a multiple access transmission scheme.

FIG. 9 shows an example flowchart for a communication node to receive a set of parameters for selection of a multiple access transmission scheme. At the receiving operation 902, a communication node, such as a UE, receives from a network node a set of parameters for selection of a multiple access transmission scheme from a plurality of multiple access transmission schemes, where the plurality of multiple access transmission schemes includes an orthogonal multiple access (OMA) scheme and a non-orthogonal multiple access (NOMA) scheme. In some embodiments, the multiple access transmission scheme may be based on a semi-persistent scheduling grant or may be based on a dynamic or normal scheduling grant. The set of parameters for selection of the multiple access transmission scheme may include at least one of: an indicator to indicate that a first multiple access transmission scheme is enabled or disabled, a maximum number of transmissions, or a time duration to transmit data.

In some embodiments, the communication node transmits the first multiple access transmission scheme data to the network node in response to receiving the indicator that indicates that the first multiple access transmission scheme is enabled, and the communication node transmits a second multiple access transmission scheme data to the network node in response to receiving the indicator that indicates that the first multiple access transmission scheme is disabled.

In some embodiments, the communication node determines that a number of transmissions to the network node using the first multiple access transmission scheme has exceeded the maximum number of transmissions without reception of a response from the network node. In response to the determining, the communication node transmits a second multiple access transmission scheme data. In some embodiments, the communication node determines, after completion of transmission of the first multiple access transmission scheme data, an absence of a response from the network node within the time duration. Based on the determining, the communication node selects a second multiple access transmission scheme to transmit the data to the network node. In some embodiments, the first multiple access transmission scheme includes the NOMA transmission scheme, and the second multiple access transmission scheme includes the OMA scheme.

In some embodiments, the communication node receives the set of parameters for the multiple access transmission scheme from the network node in response to the communication node transmitting a request to the network node.

Figure 10:
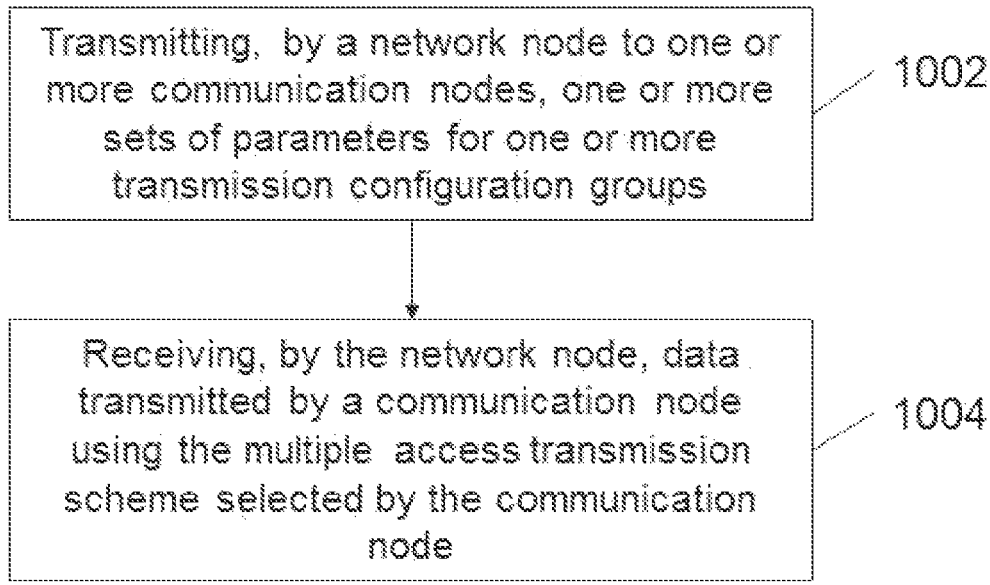
FIG. 10 shows an example flowchart for a network node to transmits one or more sets of parameters for one or more transmission configuration groups.

At the transmitting operation 904, the communication node transmits data to a network node using a multiple access transmission scheme selected by the communication node. In some embodiments, the communication node transmits the data while operating in an idle state or an inactive state FIG. 10 shows an example flowchart for a network node to transmits one or more sets of parameters for one or more transmission configuration groups. At the transmitting operation 1002, the network node transmits to one or more communication nodes, one or more sets of parameters for one or more transmission configuration groups, where the one or more sets of parameters define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme. In some embodiments, the multiple access transmission scheme may be based on a semi-persistent scheduling grant or may be based on a dynamic or normal scheduling grant. In some embodiments, each set of parameters for one or more transmission configuration groups includes at least one of: an indication of a resource used to transmit another set of parameters, a number of supported groups, a group identifier, a threshold to select a group, a flag for transmission or re-transmission, a set of parameters for multiple access signature, an indication of reference signals, an indication of resource for transmission, a set of parameters for reference signal generation, a set of parameters for a multiple access signature generation, or a set of parameters to determine the transport block size.

In some embodiments, the set of parameters for multiple access signature includes at least one of: a set of sequences for spreading, a set of sequences for scrambling, a set of parameters for transmission power adjustment, or a set of patterns for resource mapping In some embodiments, the network node configures the one or more transmission configuration groups based on at least one of following: each of the transmission configuration groups has a same set of parameters for multiple access signature and a different uplink resource indicator for transmission, each of the transmission configuration groups has a different set of parameters for multiple access signature and a same uplink resource indicator for transmission, each of the transmission configuration groups has a different set of parameters for multiple access signature and different parameters to determine the transport block size, or each of the transmission configuration groups has a same set of parameters for multiple access signature, a same uplink resource indicator for transmission, and a different spatial-relationship configured for the uplink resource associated with each group.

In some embodiments, the network node transmits the set of parameters using a common signal transmitted to the one or more communication nodes or a dedicated signal transmitted to at least one type of communication node. The type of communication node may include enhanced Mobile Broadband (eMBB), Ultra Reliable Low Latency Communications (URLCC), or massive Machine Type Communications (mMTC). In some embodiments, the network node transmits at least one set of parameters for the one or more transmission configuration groups to the communication node in response to receiving a request from the communication node.

At the receiving operation 1004, the network node receives data transmitted by a communication node using the multiple access transmission scheme selected by the communication node.

Figure 11:
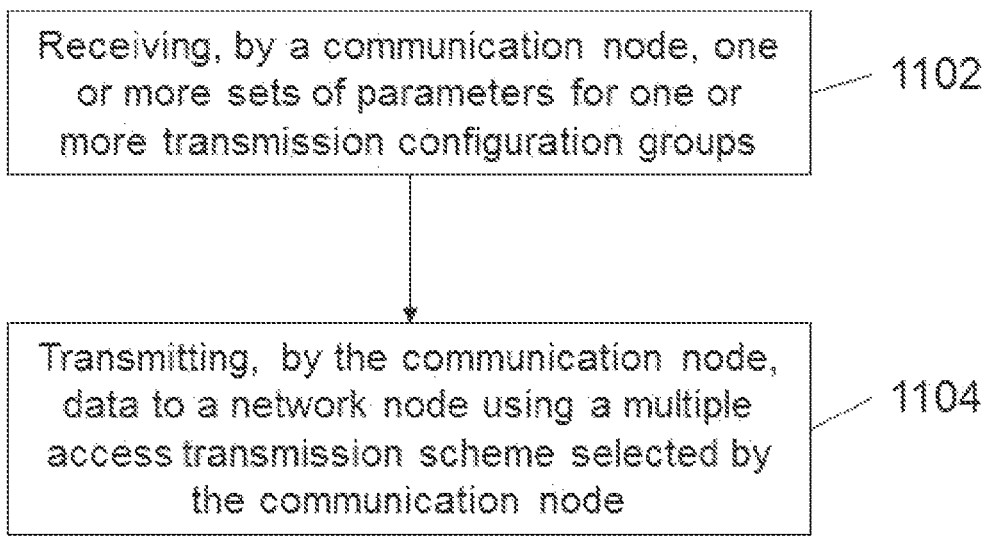
FIG. 11 shows an example flowchart for a communication node to receive one or more sets of parameters for one or more transmission configuration groups.

FIG. 11 shows an example flowchart for a communication node to receive one or more sets of parameters for one or more transmission configuration groups. At the receiving operation 1102, a communication node receives one or more sets of parameters for one or more transmission configuration groups, where the one or more sets of parameters define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme. In some embodiments, the multiple access transmission scheme may be based on a semi-persistent scheduling grant or may be based on a dynamic or normal scheduling grant.

In some embodiments, the communication node determines that a first multiple access transmission scheme is disabled for transmission in response to: determining an absence of an indication of the one or more transmission configuration groups, or determining an absence of the reception of the one or more sets of parameters for each of the one or more transmission configuration groups, where the communication node uses a second multiple access transmission scheme in response to determining that the first multiple access transmission scheme is disabled. In some embodiments, the first multiple access transmission scheme includes the NOMA scheme, and the second multiple access transmission scheme includes the OMA scheme.

In some embodiments, each set of parameters for one or more transmission configuration groups includes at least one of: an indication of a resource used to transmit another set of parameters, a number of supported groups, a group identifier, a threshold to select a group, a flag for transmission or re-transmission, a set of parameters for multiple access signature, an indication of reference signals, an indication of resource for transmission, a set of parameters for reference signal generation, a set of parameters for a multiple access signature generation, or a set of parameters to determine the transport block size.

In some embodiments, the set of parameters for multiple access signature includes at least one of: a set of sequences for spreading, a set of sequences for scrambling, a set of parameters for transmission power adjustment, or a set of patterns for resource mapping.

In some embodiments, the one or more transmission configuration groups is configured based on at least one of following: each of the transmission configuration groups has a same set of parameters for multiple access signature and a different uplink resource indicator for transmission, each of the transmission configuration groups has a different set of parameters for multiple access signature and a same uplink resource indicator for transmission, each of the transmission configuration groups has a different set of parameters for multiple access signature and different parameters to determine the transport block size, or each of the transmission configuration groups has a same set of parameters for multiple access signature, a same uplink resource indicator for transmission, and a different spatial-relationship configured for the uplink resource associated with each group.

In some embodiments, the communication node receives at least one set of parameters for the one or more transmission configuration groups from the network node in response to the communication node transmitting a request to the network node.

At the transmitting operation 1104, the communication node transmits data to a network node using the multiple access transmission scheme selected by the communication node. In some embodiments, the communication node transmits the data while operating in an idle state or an inactive state.

Figure 12:
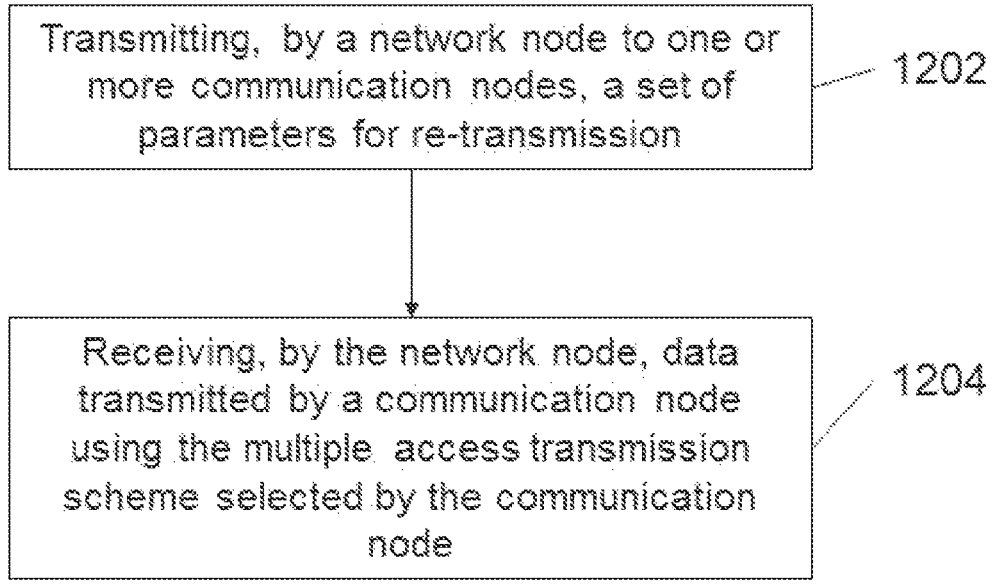
FIG. 12 shows an example flowchart for a network node to transmits set of parameters for re-transmission.

FIG. 12 shows an example flowchart for a network node to transmits set of parameters for re-transmission. At the transmitting operation 1202 a network node transmits to one or more communication nodes, a set of parameters for re-transmission, where the set of parameters for re-transmission define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme.

In some embodiments, the multiple access transmission scheme further includes may be based on a semi-persistent scheduling grant or may be a based on a dynamic scheduling grant. In some embodiments, the set of parameters for re-transmission includes an acknowledgement indicator or a non-acknowledgement indicator transmitted using a single downlink control information (DCI) for one or more transmission configuration groups. In some embodiments, the set of parameters for re-transmission includes an acknowledgement indicator or a non-acknowledgement indicator transmitted using different downlink control information (DCI) for different transmission configuration groups.

In some embodiments, the DCI for each transmission configuration group includes at least one of: a group identifier, a number of bits to indicate the acknowledgement or the non-acknowledgement, a transmission configuration for re-transmission, or a number of bits to indicate a DCI format. In some embodiments, the set of parameters for re-transmission includes an acknowledgement indicator transmitted using downlink control information (DCI) to the communication node by the network node performing a scheduling grant. In some embodiments, the DCI includes bits for scheduling, or the DCI only includes one or more bits to indicate a DCI format. In some embodiments, the one or more bits to indicate the DCI format is encoded with bits to indicate the acknowledgement.

In some embodiments, the DCI is scrambled with a radio network temporary identifier (RNTI), where the RNTI is obtained by the network node by performing at least one of following: calculating the RNTI based on an identifier of the communication node sent by the communicated node, calculating the RNTI based on the group identifier of transmission configuration, calculating the RNTI based on identifier of resource for transmission from communication node, calculating the RNTI based on an identifier of a multiple access signature selected by the communication node for transmission, or assigning to the RNTI a predetermined value for transmission scheme.

In some embodiments, the set of parameters for re-transmission includes one or more transmission configurations to be used by the communication node to re-transmit data. In some embodiments, the network node transmits the set of parameters using a common signal transmitted to the one or more communication nodes or a dedicated signal transmitted to at least one type of communication node. In some embodiments, the type of communication node includes enhanced Mobile Broadband (eMBB), Ultra Reliable Low Latency Communications (URLCC), or massive Machine Type Communications (mMTC).

In some embodiments, the network node transmits the set of parameters to the communication node in response to receiving a request from the communication node.

At the receiving operation 1204, the network node receives data transmitted by a communication node using the multiple access transmission scheme selected by the communication node.

Figure 13:
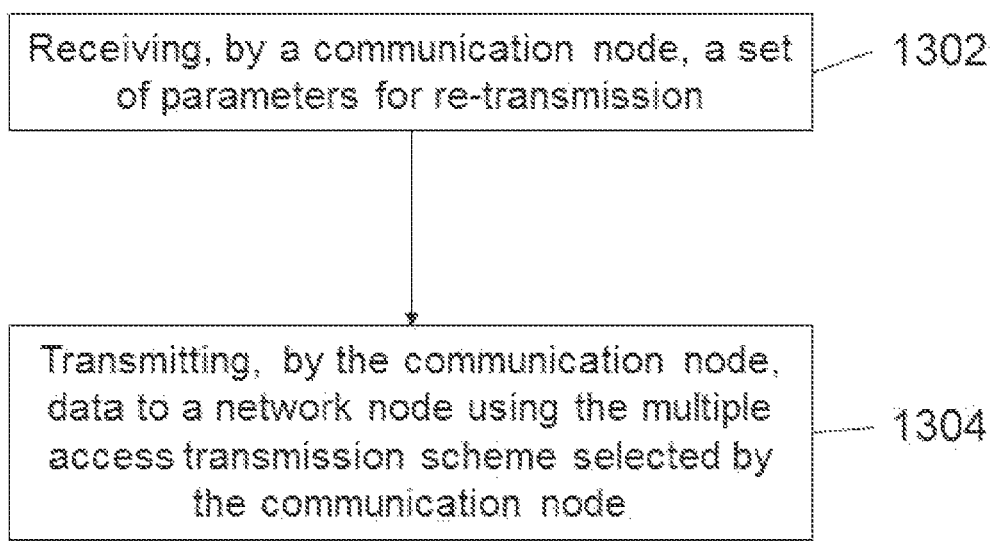
FIG. 13 shows an example flowchart for a communication node to receive a set of parameters for re-transmission.

FIG. 13 shows an example flowchart for a communication node to receive a set of parameters for re-transmission. At the receiving operation 1302, a communication node receives a set of parameters for re-transmission, where the set of parameters for re-transmission define a multiple access transmission scheme to be selected from a plurality of multiple access transmission schemes, and where the plurality of multiple access transmission schemes includes an orthogonal multiple access (OMA) scheme and a non-orthogonal multiple access (NOMA) scheme. In some embodiments, the multiple access transmission scheme may be based on a semi-persistent scheduling grant or may be based on a dynamic scheduling grant.

In some embodiments, the set of parameters for re-transmission includes an acknowledgement indicator or a non-acknowledgement indicator received in a downlink control information (DCI) for a transmission configuration group.

In some embodiments, the communication node determines, after the transmitting of the data, a non-acknowledgment condition in response to not receiving from the network node a scheduling grant via downlink control information (DCI) within a time window.

In some embodiments, the set of parameters for re-transmission includes one or more transmission configurations to be used by the communication node to re-transmit data.

In some embodiments, the communication node selects a re-transmission configuration in response to determining that a transmission of the data using another transmission configuration is associated with a non-acknowledgment condition, where the re-transmission configuration and the transmission configuration belong to a same transmission configuration group, where the communication node selects the re-transmission configuration by performing at least one of following: selecting the re-transmission configuration from the transmission configuration group, or determining the re-transmission configuration based on at least one of following parameters: a step for group re-selection, or a counter for transmission or retransmission, where the set of parameters for re-transmission include the step for group re-selection, or a maximum number of re-transmissions for the counter.

In some embodiments, the communication node selects a re-transmission configuration in response to determining that a transmission of the data using a transmission configuration is associated with a non-acknowledgment condition, where the re-transmission configuration and the transmission configuration belong to different transmission configuration groups, and where the communication node selects the re-transmission configuration by performing at least one of following: selecting the re-transmission configuration from all transmission configuration groups, selecting the re-transmission configuration from a transmission configuration group assigned for re-transmission, or determining the re-transmission configuration based on at least one of following parameters: a step for group re-selection, or a counter for transmission or retransmission, where the set of parameters for re-transmission include the step for group re-selection, or a maximum number of re-transmissions for the counter.

In some embodiments, the communication node determines different redundancy version (RV) for encoding based on at least one of: a value that indicates a step for RV cycling, or a counter for re-transmission, where the set of parameters for re-transmission include the value or a maximum number of re-transmissions for the counter.

In some embodiments, the communication node selects a resource based on at least one of: a step in time domain, a step in frequency domain, or a counter of transmission or retransmission, where the set of parameters for re-transmission include the step in time domain, the step in frequency domain, or a maximum number of re-transmissions for the counter.

In some embodiments, the communication node determines to increase or decrease power based on at least one of: a value that indicates an amount by which to ramp power, a counter for re-transmission, where the set of parameters for re-transmission include the value or a maximum number of re-transmissions for the counter.

In some embodiments, the communication node receives the set of parameters from the network node in response to the communication node transmitting a request to the network node.

At the transmitting operation 1304, by the communication node, data to a network node using the multiple access transmission scheme selected by the communication node.

In some embodiments, the communication node transmits the data while operating in an idle state or an inactive state.

Figure 14:
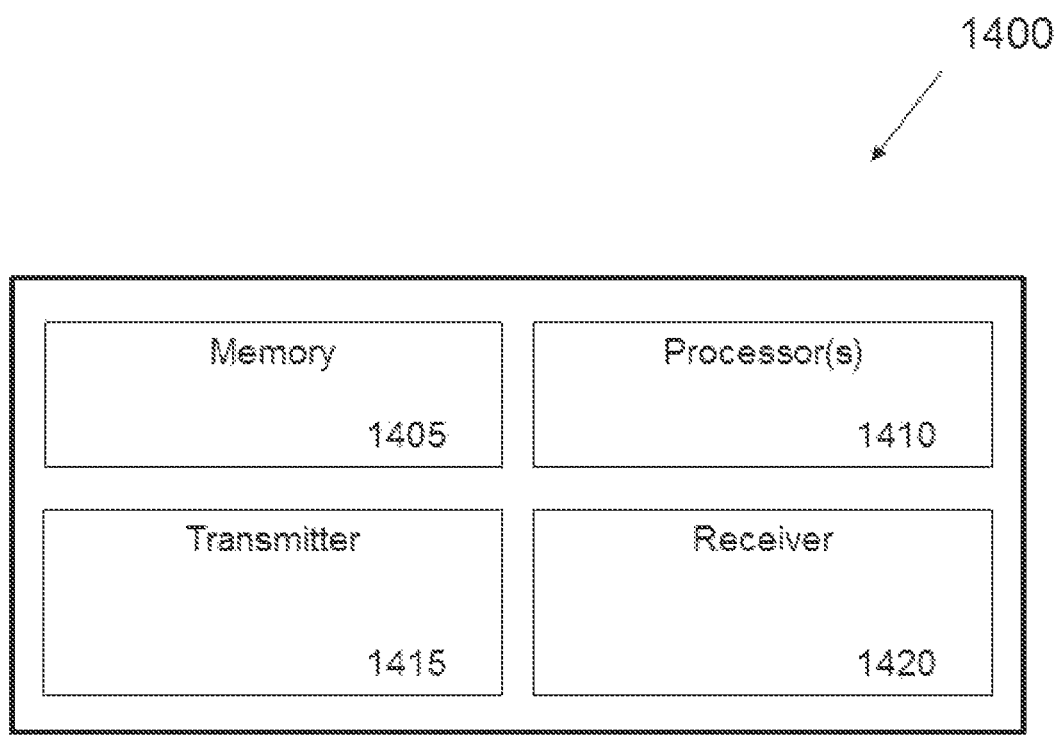
FIG. 14 shows an exemplary block diagram of a hardware platform.

FIG. 14 shows an exemplary block diagram of a hardware platform 1400 that may be a part of a network node or a communication node, such as a user equipment. The hardware platform 1400 includes at least one processor 1410 and a memory 1405 having instructions stored thereupon. The instructions upon execution by the processor 1410 configure the hardware platform 1400 to perform the operations described for FIGS. 1 to 13 and in the various embodiments described in this patent document. The transmitter 1415 transmits or sends information or data to another node. For example, a network node transmitter can send one or more sets of parameters to a user equipment(s). The receiver 1420 receives information or data transmitted or sent by another node. For example, a user equipment can receive a set of parameters from a network node.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments, modules and blocks can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

We claim:

1. A wireless communication method, comprising:
   transmitting, by a network node to one or more communication nodes, the network node being a gNB and the one or more communication nodes being one or more user equipments (UEs), a set of parameters for selection of a multiple access transmission scheme from a plurality of multiple access transmission schemes,
   wherein the plurality of multiple access transmission schemes includes an orthogonal multiple access (OMA) scheme and a non-orthogonal multiple access (NOMA) scheme, and
   wherein the set of parameters for selection of the multiple access transmission scheme includes a single-bit indicator to indicate whether or not the NOMA scheme is enabled, and the set of parameters also includes a maximum number of transmissions that may be attempted using the NOMA scheme, wherein after reaching the maximum number of transmissions using the NOMA scheme, the one or more UEs are to use the OMA scheme, the single-bit indicator being included in a system information block transmitted by the network node; and
   receiving, by the network node, data transmitted by a communication node using the multiple access transmission scheme selected by the communication node based on the set of parameters transmitted by the network node to the one or more communication nodes,
   wherein the network node uses different system information blocks to transmit the indicator to different types of communication nodes, wherein each system information block corresponds to a type of communication node.

2. The method of claim 1, wherein the multiple access transmission scheme is based on a semi-persistent scheduling grant or a dynamic scheduling grant.

3. The method of claim 1,
   wherein the network node receives NOMA transmission scheme data from the communication node in response to transmitting the indicator that indicates that the NOMA transmission scheme is enabled, and
   wherein the network node receives OMA transmission scheme data from the communication node in response to transmitting the indicator that indicates that the NOMA transmission scheme is disabled.

4. The method of claim 1, wherein the network node transmits the set of parameters using a common signal transmitted to the one or more communication nodes or a dedicated signal transmitted to at least one type of communication node.

5. The method of claim 1, wherein the network node transmits the set of parameters for the multiple access transmission scheme to the communication node in response to receiving a request from the communication node.

6. The method of claim 1, wherein the type of communication node includes enhanced Mobile Broadband (eMBB), Ultra Reliable Low Latency Communications (URLCC), or massive Machine Type Communications (mMTC).

7. A wireless communication method, comprising:
receiving, by a communication node, a set of parameters for selection of a multiple access transmission scheme from a plurality of multiple access transmission schemes, the communication node being a user equipment (UE),
wherein the plurality of multiple access transmission schemes includes an orthogonal multiple access (OMA) scheme and a non-orthogonal multiple access (NOMA) scheme,
wherein the set of parameters for selection of the multiple access transmission scheme includes a single-bit indicator to indicate whether or not the NOMA scheme is enabled, and the set of parameters also includes a maximum number of transmissions that may be attempted using the NOMA scheme, wherein after reaching the maximum number of transmissions using the NOMA scheme, the communication node is to use the OMA scheme, the single-bit indicator being included in a system information block transmitted by a network node, the network node being a gNB; and
transmitting, by the communication node, data to a network node using the multiple access transmission scheme selected by the communication node based on the set of parameters received by the communication node,
wherein the communication node receives the set of parameters using a dedicated signal transmitted to at least one type of communication node.

8. The method of claim 7, wherein the multiple access transmission scheme is based on a semi-persistent scheduling grant or a dynamic scheduling grant.

9. The method of claim 7, wherein the set of parameters for selection of the multiple access transmission scheme includes:
a time duration to transmit data.

10. The method of claim 9, further comprising:
determining, by the communication node, after completion of transmission of NOMA transmission scheme data, an absence of a response from the network node within the time duration; and
selecting, by the communication node, based on the determining, the OMA transmission scheme to transmit the data to the network node.

11. The method of claim 7, wherein the communication node receives the set of parameters for the multiple access transmission scheme from the network node in response to the communication node transmitting a request to the network node.

12. The method of claim 7, wherein the communication node transmits the data while operating in an idle state or an inactive state.

13. The method of claim 7,
wherein the communication node transmits NOMA transmission scheme data to the network node in response to receiving the indicator that indicates that the NOMA transmission scheme is enabled, and
wherein the communication node transmits OMA transmission scheme data to the network node in response to receiving the indicator that indicates that the NOMA transmission scheme is disabled.

14. An apparatus for wireless communication, comprising a memory and a processor, wherein the processor reads code from the memory and is configured for:
receiving, by a communication node, a set of parameters for selection of a multiple access transmission scheme from a plurality of multiple access transmission schemes, the communication node being a user equipment (UE),
wherein the plurality of multiple access transmission schemes includes an orthogonal multiple access (OMA) scheme and a non-orthogonal multiple access (NOMA) scheme,
wherein the set of parameters for selection of the multiple access transmission scheme includes a single-bit indicator to indicate whether or not the NOMA scheme is enabled, and the set of parameters also includes a maximum number of transmissions that may be attempted using the NOMA scheme, wherein after reaching the maximum number of transmissions using the NOMA scheme, the communication node is to use the OMA scheme, the single-bit indicator being included in a system information block transmitted by a network node, the network node being a gNB; and
transmitting, by the communication node, data to a network node using the multiple access transmission scheme selected by the communication node based on the set of parameters received by the communication node,
wherein the communication node receives the set of parameters using a dedicated signal transmitted to at least one type of communication node.

15. The apparatus of claim 14, wherein the multiple access transmission scheme is based on a semi-persistent scheduling grant or a dynamic scheduling grant.

* * * * *